United States Patent
Nakai et al.

(10) Patent No.: US 7,203,003 B2
(45) Date of Patent: Apr. 10, 2007

(54) REFLECTIVE AG ALLOY FILM FOR REFLECTORS AND REFLECTOR PROVIDED WITH THE SAME

(75) Inventors: Junichi Nakai, Kobe (JP); Toshiki Sato, Kobe (JP); Katsutoshi Takagi, Kobe (JP); Yuuki Tauchi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 302 days.

(21) Appl. No.: 10/870,996

(22) Filed: Jun. 21, 2004

(65) Prior Publication Data

US 2004/0263984 A1 Dec. 30, 2004

(30) Foreign Application Priority Data

Jun. 27, 2003 (JP) ............... 2003-185307

(51) Int. Cl.
*G02B 1/10* (2006.01)

(52) U.S. Cl. ............... 359/580; 359/584; 359/585; 359/900

(58) Field of Classification Search ............... 359/580, 359/584, 585, 900
See application file for complete search history.

(56) References Cited

U.S. PATENT DOCUMENTS

| 4,337,990 A | 7/1982 | Fan et al. |
| 4,610,903 A | 9/1986 | Nomura et al. |
| 4,639,069 A | 1/1987 | Yatabe et al. |
| 5,328,813 A * | 7/1994 | Strandjord et al. ......... 430/321 |
| 2004/0258960 A1* | 12/2004 | Ishikawa et al. ...... 428/694 BB |
| 2004/0263984 A1 | 12/2004 | Nakai et al. |
| 2006/0134367 A1* | 6/2006 | Nee ......................... 428/64.1 |

FOREIGN PATENT DOCUMENTS

| JP | 9-135096 | 5/1997 |
| JP | 10-153788 | 6/1998 |
| JP | 11-231122 | 8/1999 |
| JP | 2000-106017 | 4/2000 |
| JP | 2001-184725 | 7/2001 |
| JP | 2001-226765 | 8/2001 |

OTHER PUBLICATIONS

U.S. Appl. No. 11/375,036, filed Mar. 15, 2006, Tauchi et al.
U.S. Appl. No. 11/333,492, filed Jan. 18, 2006, Tauchi et al.
U.S. Appl. No. 11/428.045, filed Jun. 30, 2006, Fujii et al.
U.S. Appl. No. 11/425,062, filed Jun. 19, 2006, Tauchi et al.
U.S. Appl. No. 11/425,068, filed Jun. 19, 2006, Nakai et al.

* cited by examiner

*Primary Examiner*—Fayez G. Assaf
(74) *Attorney, Agent, or Firm*—Oblon, Spivak, McClelland, Maier & Neustadt, P.C.

(57) ABSTRACT

A reflective Ag alloy film includes a Ag—Bi alloy thin film, and a Bi layer and/or a Bi oxide layer formed on the surface and/or between the Ag—Bi alloy thin film and another layer formed on the Ag—Bi alloy thin film. The thickness of the Bi layer and/or the Bi oxide layer is 2.0 nm or below. The Ag—Bi alloy thin film of the reflective Ag alloy film has a Bi content in the range of 0.01 to 3.0 at %. A reflector is formed by depositing the Ag—Bi alloy thin film on a base member.

8 Claims, 3 Drawing Sheets

REFLECTIVE AG ALLOY FILM FOR REFLECTORS AND REFLECTOR PROVIDED WITH THE SAME

BACKGROUND OF THE INVENTION

1. Field of the Invention

The present invention relates to a reflective Ag alloy film for reflectors, and a reflector provided with the same.

2. Description of the Related Art

A highly reflective Ag film has been used for forming various optical mirrors. Reflectors for automotive lamps, reflectors for lighting devices, and reflecting sheets for liquid crystal display panels are optical mirrors. Optical mirrors are also optical parts for utensils including cameras and video recorders, and semiconductor device fabricating systems including pattern exposure systems.

Reflectors of automotive lamps and lighting devices must be highly heat-resistant because those reflectors are heated at temperatures in the range of 110 to 200° C. by heat generated by a light-emitting element. Reflectors to be used in a high-temperature high-humidity environment must be corrosion resistant. Although reflectors, such as backlight sheets for liquid crystal display panels, and those for optical devices are not exposed to high temperature, those reflectors must have a high reflectivity. Therefore, it is desirable that those reflectors are not coated with a protective film and hence those reflectors are required to have still higher capability to withstand environmental conditions.

The Ag film does not have satisfactory capability to withstand environmental conditions, the ability of the Ag film is deteriorated by moisture. Thus, the Ag film has difficulty in maintaining its function for a long period of use. Therefore, the deterioration of the Ag film is prevented by coating the Ag film with a protective film of a UV-curable resin, an acrylic resin or a ceramic material. The durability of the Ag film coated with the protective film of a resin or a ceramic material is unsatisfactory because the barrier property of the protective film of a resin is unsatisfactory and the protective film of a ceramic material has pinholes and cracks and permits the penetration of moisture. Since cohesion occurs readily in the Ag film when the Ag film is heated to deteriorate the reflectivity of the Ag film, the Ag film is unsuitable for use in a high-temperature environment.

A reflector having improved barrier property and heat resistance proposed in JP-A No. 2000-106017 is provided with a protective film of a resin having improved heat resistance and weather resistance. A technique for improving the corrosion resistance of an Ag alloy disclosed in JP-A No. 2001-226765 adds Pd or Cu to an Ag alloy. A reflector proposed in JP-A No. 9-135096 is provided with an Ag film of an Ag alloy containing 3 at % of one or some of Pb, Cu, Au, Ni, Zn, Cd, Mg and Al. A technique for improving the cohesion resistance of Ag disclosed in JP-A No. 11-231122 adds Pb, Cu, Au, Ni, Pd, Pt, Zn, Cd, Mg or Al to Ag. A technique for improving the cohesion resistance of Ag disclosed in Jpn. Pat. App. No. 13-351572 adds Sc, Y and a rare earth element to Ag. This technique is not intended for application to reflectors.

The reflective thin film of a reflector is required to have a high reflectivity, a high weather resistance and a high heat resistance. However, any metal thin films meeting all those requirements have not been developed and proposed. The conventional Ag thin film having a high reflectivity coheres easily when exposed to moisture containing a halogen or to heat. Therefore, even if the Ag thin film is coated with a protective film, the Ag thin film alters easily starting from parts thereof corresponding to defects in the protective film, and white spots are formed or the Ag thin film is clouded.

SUMMARY OF THE INVENTION

The present invention has been made in view of the foregoing problems and it is therefore an object of the present invention to provide a reflective Ag alloy film for reflectors, having a high reflectivity and excellent in weather resistance and heat resistance, and to provide a reflector provided with the same Reflective Ag alloy film having the foregoing excellent characteristics.

The inventors of the present invention made earnest studies and found that a reflective Ag alloy film built by forming a Bi layer and/or a Bi oxide layer on the surface of an Ag alloy thin film and/or between the Ag alloy thin film and another layer formed on the Ag alloy thin film has a high reflectivity, is excellent in weather resistance and heat resistance, and is suitable for use as a reflective film for reflectors. The present invention has been made on the basis of such knowledge acquired through the studies. Thus, the present invention provides a reflective Ag alloy film for reflectors, having a high reflectivity and excellent in weather resistance and heat resistance, and a reflector provided with this Reflective Ag alloy film having the foregoing excellent characteristics.

According to a first aspect of the present invention, a reflective Ag alloy film for reflectors includes: an Ag alloy thin film containing Bi; and a Bi layer and/or a Bi oxide layer formed on the surface of the Ag alloy thin film and/or between the Ag alloy thin film and another layer formed on the Ag alloy thin film.

In the reflective Ag alloy film according to the present invention, the Bi layer and/or the Bi oxide layer may have a thickness of 2.0 nm or below.

In the reflective Ag alloy film according to the present invention, the Ag alloy thin film may have a Bi content in the range of 0.01 to 3.0 at %.

In the reflective Ag alloy film according to the present invention, the Ag alloy thin film may contain Nd or Y or both Nd and Y in a content in the range of 0.1 to 3.0 at %.

In the reflective Ag alloy film according to the present invention, the Ag alloy thin film may contain one or some of Au, Pt, Pd and Cu in a content in the range of 0.3 to 5.0 at %.

According to a second aspect of the present invention, a reflector includes: a base member; and the reflective Ag alloy film according to the first aspect of the present invention.

Preferably, the reflector according to the present invention further includes a transparent protective layer formed over the reflective Ag alloy film.

In the reflector according to the present invention, the Ag alloy thin film may be deposited on the base member by a sputtering process.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
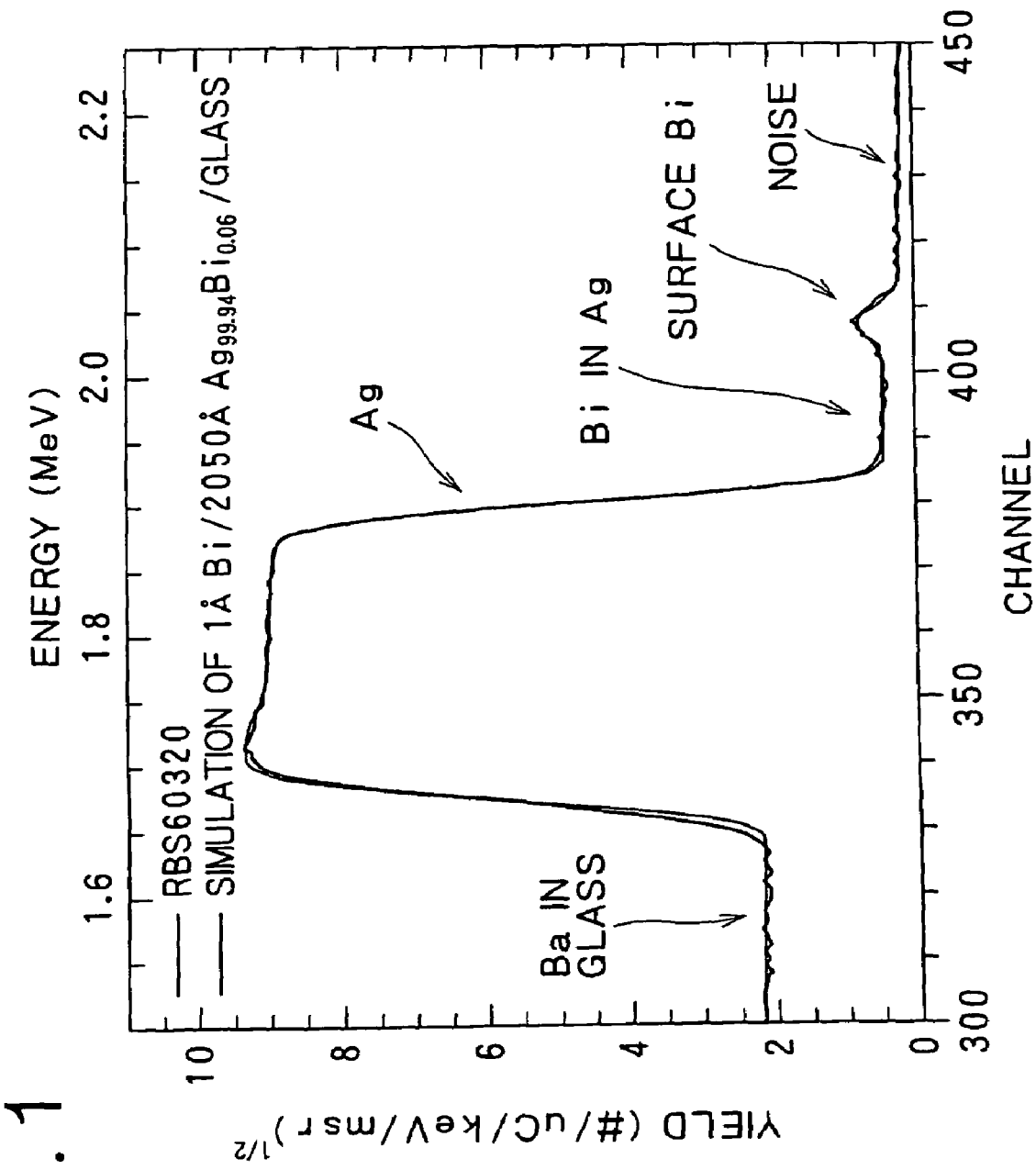
FIG. 1 is a graph showing data representing the relation between channel, energy and yield obtained through the analysis of an Ag alloy thin film formed by using an Ag alloy target containing 0.1% Bi for forming a reflective Ag alloy film in a preferred embodiment according to the present invention, by Rutherford backscattering spectrometry.

A reflective thin film is required to have a high reflectivity, a high weather resistance and a high heat resistance. The inventors of the present invention formed various Ag alloy thin films having different compositions by sputtering processes respectively using various Ag alloys as targets, and analyzed the compositions of the Ag alloy thin films and examined the reflective characteristics of the Ag alloy thin films. The Ag alloy thin films were subjected to an environmental test, in which specimens are kept in an test environment of a temperature of about 80° C. and a humidity of about 90% RH for several tens to several hundreds hours, and a salt water resistance test, in which specimens are sprayed with or immersed in salt water, and the chemical stability and fine structural changes were examined to elucidate causes of reduction of the reflectivity and other functional characteristics, and the following facts were found.

(1) A Ag-base alloy film containing Bi, namely, an Ag alloy thin film containing Bi, has a high reflectivity, and suppresses the diffusion of Ag atoms in a test environment for the environment test (80° C. and 90% RH), and suppresses the growth of crystal grains and the increase of surface roughness due to the diffusion of Ag atoms. The addition of Bi to Ag does not reduce the reflectivity of the Ag alloy thin film significantly, maintains a high reflectivity nearly equal to that of a pure-Ag film, and improves the heat resistance of the Ag alloy thin film. Such effects of Bi addition are significant with an Ag alloy thin film having a Bi content of 0.01 at % or above.

(2) An Ag alloy thin film containing Bi has a reflectivity nearly equal to that of a pure-Ag film and is superior to a pure-Ag film in chemical stability (particularly, in salt water resistance). Thus, the addition of Bi to Ag improves weather resistance (chemical stability) without causing significant reduction of reflectivity and maintaining a high reflectivity nearly equal to that of a pure-Ag film. Such effects of Bi addition are significant with an Ag alloy thin film having a Bi content of 0.01 at % or above.

(3) The high weather resistance (chemical stability) of the Ag alloy thin film containing Bi owes to the barrier effect of a Bi oxide layer formed on the surface of the Ag alloy thin film. The barrier effect of the Bi oxide film enhances the chemical stability of the Ag alloy thin film.

The Bi layer formed on the surface of the Ag alloy thin film or a Bi oxide layer formed through the oxidation of the Bi layer exercises a barrier effect. When a Bi layer and a Bi oxide layer are formed on the surface of the Ag alloy thin film, both the Bi oxide layer and the Bi layer exercise a barrier effect.

When a surface layer is formed on the Ag alloy thin film, and a Bi oxide layer is formed between the Ag alloy thin film and the surface layer, the Bi oxide layer exercises a barrier effect. When a Bi layer or both a Bi layer and a Bi oxide layer are formed between the Ag alloy thin film and the surface layer, the Bi layer or both the Bi and Bi oxide layer exercise a barrier effect.

(4) The Ag alloy thin film containing Bi has a reflectivity nearly equal to that of a pure-Ag film a high heat resistance improved by Bi, and the chemical stability and the weather resistance of the Ag alloy thin film are enhanced by the barrier effect of the Bi layer and/or the Bi oxide layer formed on the surface of the Ag alloy thin film and/or between the Ag alloy thin film and the surface layer formed on the Ag alloy thin film. Thus, the Ag alloy thin film containing Bi has a high reflectivity, and is excellent in weather resistance and heat resistance.

(5) Desirably, the Bi content of the Ag alloy thin film is in the range of 0.01 to 3.0 at %. The reasons for such a range of Bi content will be described.

Bi has a very low solubility limit in forming a solid solution with Ag and diffuses easily. Therefore, a Bi layer is formed on the surface of the Ag alloy thin film and between the Ag alloy thin film and the surface layer, the Bi layer is oxidized and a Bi layer and a Bi oxide layer are formed, or a Bi oxide layer is formed. Even if the Bi content of the Ag alloy thin film is as small as about 0.01 at %, the Bi layer or the Bi layer and the Bi oxide layer exercise a barrier effect. The thickness of the Bi layer and the Bi oxide layer increases and the amount of Bi contained in the Ag alloy thin film increases as the Bi content increases. Consequently, the reflectivity is low if the Bi content of the Ag alloy thin film is excessively large and the Ag alloy thin film cannot maintain a high reflectivity. Therefore, it is desirable that the Bi content is in the range of 0.01 to 3.0 at %.

When the Bi content is in the range of 0.01 to 3.0 at %, the Ag alloy thin film has a high reflectivity nearly equal to that of a pure-Ag film. More preferably, the Bi content is in the range of 0.05 to 1.0 at % to form an Ag alloy thin film having a higher reflectivity.

(6) JP-A No. 10-153788 discloses an oxide film forming method of forming an oxide film on the surface of an Ag alloy thin film. This oxide film forming method forms an Ag alloy thin film containing Ag and an easily oxidizable element, such as Ti, Zr, Hf, Ta, Nb, Si, B, La, Nd, Sm, Eu, Gd, Dy, Y, Yb, Ce, Mg or Th, and forms an oxide film on the surface of the Ag alloy thin film. Since Bi diffuses easily in the surface of an Ag alloy thin film containing Bi, a barrier film can be formed even if the Ag alloy thin film has a very small Bi content. Thus, a barrier film can be formed on the surface of an Ag alloy thin film containing Bi without causing significant reduction in reflectivity by an increased Bi content, maintaining a high reflectivity nearly equal to that of pure-Ag film, and thereby the chemical stability can be improved.

(7) An Ag alloy thin film having a Bi content in the range of 0.01 to 3.0 at % and at least one of Au, Pt, Pd, Cu and Rh is more excellent in chemical stability, particularly, oxidation resistance. Desirably, the content of at least one of Au, Pt, Pd, Cu and Rh is in the range of 0.1 to 3.0 at % in view of initial reflectivity, i.e., the reflectivity of the Ag alloy thin film in an unused state or at a stage where the Ag alloy thin film is not exposed to a hot environment or a hot, humid environment after being formed. If only one of those elements is added to the Ag alloy thin film, recommended Au content, Pt content, Pd content and Rh content are in the range of 0.5 to 3.0 at %, 0.5 to 5.0 at %, 0.5 to 3.0 at % and 0.5 to 3.0 at %, respectively. Those additive elements have no effect of suppressing increase in crystal grin size.

The present invention has been made on the basis of the foregoing knowledge. An Ag alloy thin film according to the present invention for reflectors has a high reflectivity and is excellent in weather resistance and heat resistance.

The Reflective Ag alloy film for reflectors is built by forming a Bi layer and/or a Bi oxide layer on the surface of an Ag alloy thin film and/or between the Ag alloy thin film and another layer formed on the Ag alloy thin film. As mentioned above, the addition of Bi to the Ag alloy thin film forms a Bi layer and/or a Bi oxide layer on the surface of an Ag alloy thin film and/or between the Ag alloy thin film and another layer formed on the Ag alloy thin film, the barrier effect of those layers improves the heat resistance and the weather resistance (chemical stability) without causing significant reduction of reflectivity and maintaining a high reflectivity nearly equal to that of a pure-Ag film. Thus, the reflective Ag alloy film has a high reflectivity and is excellent in weather resistance and heat resistance.

In the reflective Ag alloy film, the thickness of the Bi layer and/or the Bi oxide layer is 2.0 nm or below. The Bi layer and/or the Bi oxide layer of a thickness of 2.0 nm or below does not reduce the reflectivity of the Ag alloy thin film. The effect of the Bi layer and/or the Bi oxide layer on reducing light transmission is not negligible and tends to reduce the reflectivity if the thickness of the Bi layer and/or the Bi oxide layer exceeds 2.0 nm. Thus, it is desirable that the thickness of the Bi layer and/or the Bi oxide layer is 2.0 nm or below.

The Ag alloy thin film of the reflective Ag ally film has a Bi content in the range of 0.01 to 3.0 at %. The reflective Ag alloy film having this Ag alloy thin film has a high reflectivity and is excellent in weather resistance and heat resistance. The weather resistance and the heat resistance of the reflective Ag alloy film tend to decrease when the Bi content is below 0.01 at %. The reflectivity of the reflective Ag alloy film tends to decrease when the Bi content is above 3.0 at %.

Desirably, the Ag alloy thin film contains Nd or Y or both Nd and Y in a content in the range of 0.1 to 3.0 at %. Such an Ag alloy thin film has improved heat resistance. Desirably, the Ag alloy thin film contains one or some of Au, Pt, Pd and Cu in a content in the range of 0.3 to 5.0 at %. Addition of one or some of Au, Pt, Pd and Cu to the Ag alloy thin film further improves the chemical stability, particularly, oxidation resistance. The chemical stability is improves slightly when the content of one or some of Au, Pt, Pd and Cu is below 0.3 at %. The initial reflectivity tends to decrease when the content of one or some of Au, Pt, Pd and Cu is above 5.0 at %.

The reflector of the present invention is formed by forming the reflective Ag alloy film of the present invention on a base member. The reflector has a high reflectivity and is excellent in weather resistance and heat resistance.

A transparent protective layer ford on the reflective Ag alloy film of the reflector protects the reflective Ag alloy film from abrasion and wear, prevents the reflective Ag alloy film from coming off the base member, and improves strength against scratching.

A sputtering process is capable of forming a reflective Ag alloy film having a high density and a high adhesion The Ag alloy thin film of the reflective Ag alloy film of the present invention for reflectors can be formed by, for example, a sputtering process using a sputtering target of an Ag alloy suitable for forming the Ag alloy thin film.

A sputtering target of an Ag alloy having a Bi content in the range of 0.3 to 10.0 at % is used for forming an Ag alloy thin film having a Bi content in the range of 0.01 to 3.0 at %. When an Ag alloy thin film is formed by a sputtering process using a sputtering target of an Ag alloy containing Bi, the Bi content of the Ag alloy thin film is smaller than that of the sputtering target. Therefore, The sputtering target of an Ag alloy having a Bi content in the range of 0.3 to 10.0 at % needs to be used for forming an Ag alloy thin film having a Bi content in the range of 0.01 to 3.0 at %.

A sputtering target of an Ag alloy containing at lease either Nd or Y in a content in the range of 0.1 to 3.0 at % in addition to Bi is used to form an Ag alloy thin film containing at least either Nd or Y in a content in the range of 0.1 to 3.0 at % in addition to Bi. A sputtering target of an Ag alloy containing one or some of Au, Pt, Pd and Cu in a content in the range of 0.3 to 5.0 at % in addition to Bi and at lease either Nd or Y is used to form an Ag alloy thin film containing one or some of Au, Pt, Pd and Cu in a content in the range of 0.3 to 5.0 at % in addition to Bi and at lease either Nd or Y.

The reflector of the present invention provided with the reflective Ag alloy film is formed by depositing an Ag alloy thin film containing Bi on the base member, such as a glass substrate, by a sputtering process using a sputtering target of an Ag alloy containing Bi. During the formation of the Ag alloy thin film containing Bi or after the formation of the same, Bi diffuses in the surface of the Ag alloy thin film to form a Bi layer. Since Bi has a very low solubility limit in forming a solid solution with Ag and diffuses easily as mentioned above, a Bi layer is formed on the surface of the Ag alloy thin film.

If the Ag alloy thin film is exposed to an oxidizing atmosphere during deposition, the Bi layer is oxidized, and a layer consisting of a Bi layer and a Bi oxide layer, or a Bi oxide layer is formed. If the Ag alloy thin film is not exposed to an oxidizing atmosphere during deposition, a layer consisting of a Bi layer and a Bi oxide layer overlying the Bi layer, or a Bi oxide layer is formed through the oxidation of the Bi layer when the Ag alloy thin film is exposed to an oxidizing atmosphere after a Bi layer has been formed.

The degree of oxidation of the Bi layer is dependent on the oxygen concentration and temperature of the oxidizing atmosphere, and the thickness of the Bi layer. A layer consisting of a Bi layer and a Bi oxide layer overlying the Bi layer is formed when the Bi layer is oxidized moderately. A Bi oxide layer is formed when the Bi layer is oxidized intensely.

The Bi layer or the Bi oxide layer may be formed by a sputtering process or the like after forming an Ag alloy thin film containing Bi.

Examples of the present invention and comparative examples will be described hereinafter. In the following description, the content of a component of an alloy is expressed in atomic percent (percent at.), which will be simply represented by "%".

EXAMPLE 1

Ag—Bi alloy thin films of 2000 Å in thickness in Example 1, i.e., Ag alloy thin films containing Bi, were formed on glass substrates (#1737, Corning) of 50 mm in diameter and 0.7 mm in thickness, respectively, by a dc magnetron sputtering system. The Ag—Bi alloy thin films were deposited at a deposition rate in the range of 7.0 to 8.0 nm/s on the substrates kept at a room temperature in an Ar gas atmosphere of 1 to 3 mtorr. Anode-cathode distance was 55 m. A processing vessel was evacuated to a vacuum of $1.0 \times 10^{-5}$ torr or below before starting the sputtering process. A Ag—Bi sputtering target of a Ag—Bi alloy having a Bi content of 0.1%, and a Ag—Bi sputtering target of a Ag—Bi alloy having a Bi content of 1.0% were used.

Ag—Bi alloy thin films thus formed were analyzed by Rutherford backscattering spectrometry (RBS) and x-ray photoelectron spectroscopy (XPS). Table 1 shows conditions for RBS.

Conditions for XPS
Apparatus: PHI5400MC, Palkin Elmer
X-ray source: MgKα, 400 W (15 kV, 26.7 mA)
Diameter of analyzed region: 1.1 mm
Angle of photoelectron emission (Angle of detector to the surface of a specimen): 45°
Sputtering rate: 1.5 nm/min (3 kV·25 mA) $SiO_2$ equivalent
Method of analysis: Analysis of the surface of the specimen after every 1 min, 2 min, 3 min and 4 min sputtering.

Figure 2:
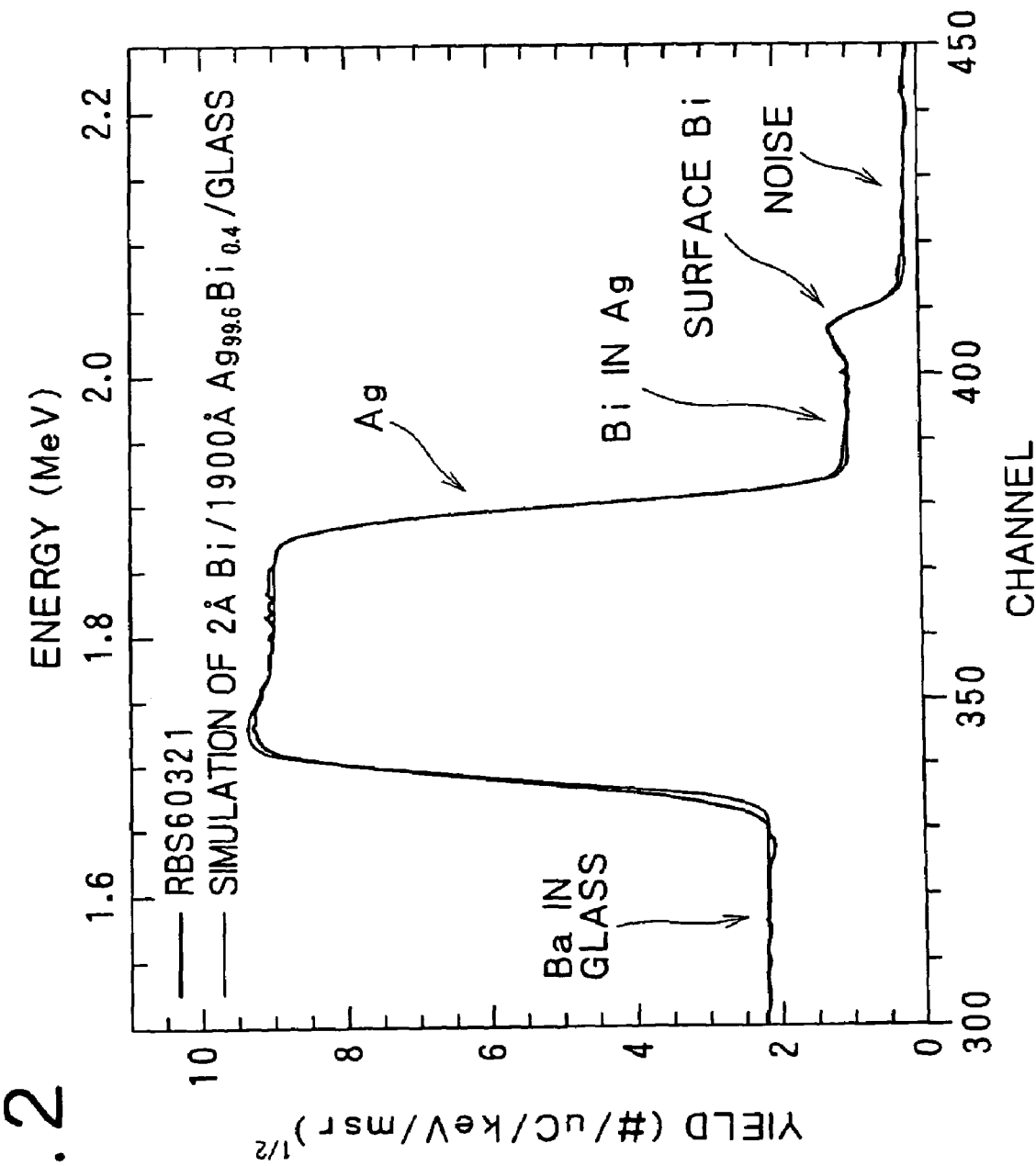
FIG. 2 is a graph showing data representing the relation between channel, energy and yield obtained through the analysis of an Ag alloy thin film formed by using an Ag alloy target containing 1.0% Bi, for forming a reflective Ag alloy film in a preferred embodiment according to the present invention, by Rutherford backscattering spectrometry.
Figure 3:
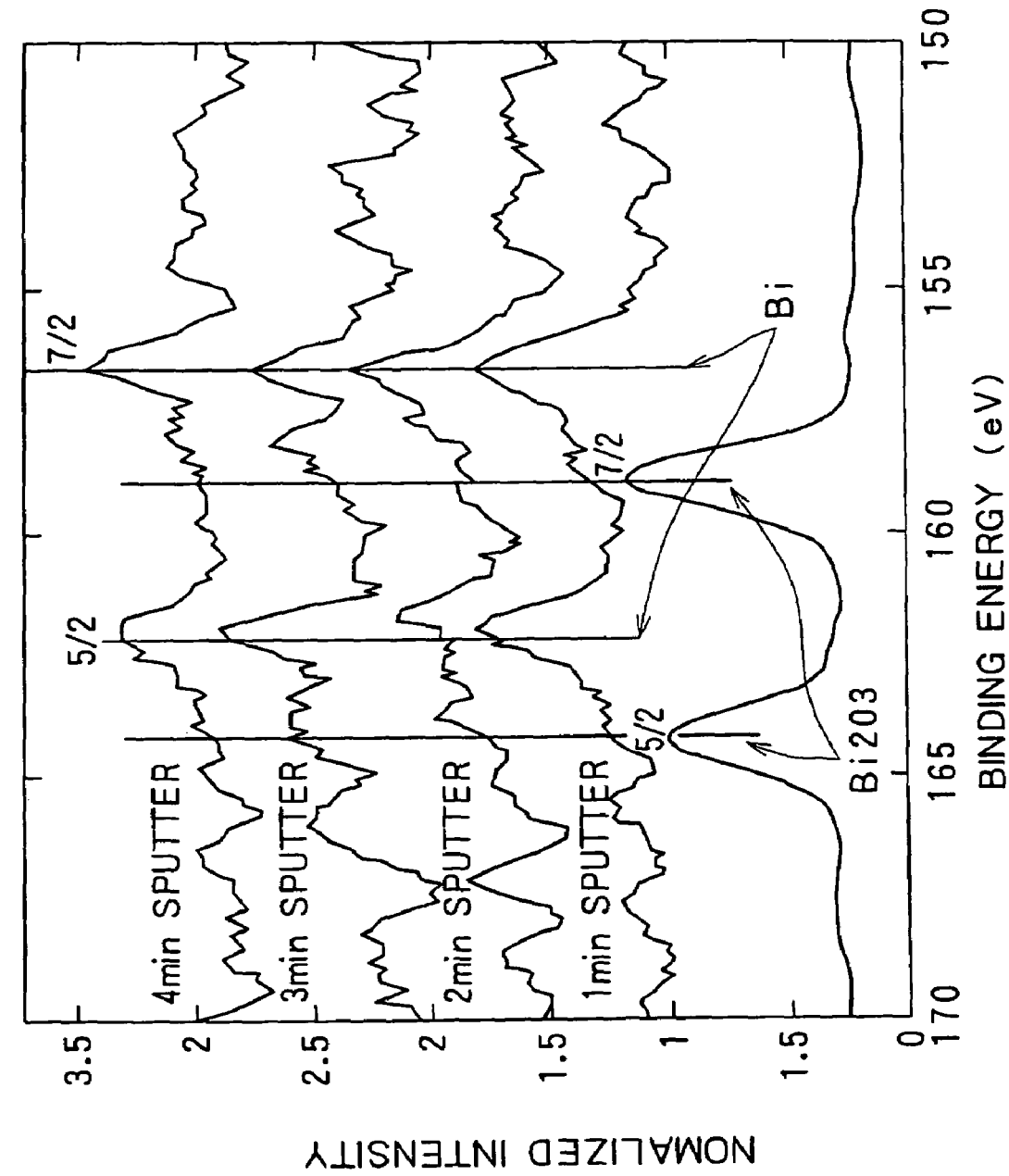
FIG. 3 is a graph showing data representing the relation between binding energy and normalized intensity obtained through the analysis of an Ag alloy thin film formed by using an Ag alloy target containing 1.0% Bi for forming a reflective Ag alloy film in a preferred embodiment according to the present invention, by x-ray photoelectron spectroscopy.

Results of the analysis are shown in FIGS. 1 to 3. FIG. 1 shows the results of analysis of a Ag—Bi alloy thin film formed by using a sputtering target of a Ag—Bi alloy containing 0.1% Bi obtained by RBS. The Bi content of the Ag alloy thin film was about 0.06%, and the surface of the Ag—Bi alloy thin film had the largest Bi content.

FIG. 2 shows the results of analysis of a Ag—Bi alloy thin film formed by using a sputtering target of a Ag—Bi alloy containing 1.0% Bi obtained by RBS. The Bi content of the Ag alloy thin film was about 0.4%, and the surface of the Ag—Bi alloy thin film had the largest Bi content.

FIG. 3 shows the results of analysis of a Ag—Bi alloy thin film formed by using a sputtering target of a Ag—Bi alloy containing 1.0% Bi obtained by XPS. $Bi_2O_3$ was detected in the surface of the Ag—Bi alloy thin film. $Bi_2O_3$ was not detected in the surface at a state after the duration of sputtering for 1 min. The $SiO_2$ equivalent thickness of a $Bi_2O_3$ layer (Bi oxide layer) was 1.5 nm or below.

Each of the Ag—Bi alloy thin films of those compositions had a surface layer having a high Bi content. The surface layer having a high Bi content was a $Bi_2O_3$ layer of a thickness of about 2.0 nm or below.

EXAMPLE 2 AND COMPARATIVE EXAMPLE 1

Ag—Bi alloy thin films of 2000 Å in thickness in Example 2, i.e., Ag alloy thin films containing Bi, were formed on glass substrates (#1737, Corning) of 50 mm in diameter and 0.7 mm in thickness, respectively, by a dc magnetron sputtering system. Conditions for forming the Ag—Bi alloy thin films were the same as those for forming the Ag—Bi alloy thin films in Example 1. A Ag—Nd alloy thin film, a Ag—In alloy thin film, a Ag—Nb alloy thin film and a Ag—Sn alloy thin film, i.e., Ag alloy thin films in Comparative example 1, were formed. A $Bi_2O_3$ layer was formed on the surface of the Ag—Bi alloy thin films.

The initial reflectivities of those Ag alloy thin films to light of 405 nm in wavelength were measured. The post-Ag-cohesion reflectivities of those Ag alloy thin films, i.e., reflectivities of the Ag alloy thin films after a constant hygrothermal test for Ag cohesion, to light of 405 nm in wavelength were measured after keeping the Ag alloy thin films in a constant-temperature constant-humidity atmosphere of 90° C. and 80% RH for 48 hr for the constant hygrothermal test. The surfaces of the Ag alloy thin films were examined for white spots after Ag cohesion. The Ag alloy thin films were subjected to a salt water immersion test using salt water having a salt concentration of 0.05 mol/l to examine the salt water resistance of the Ag alloy thin films. The composition of each of the Ag alloy thin films was analyzed by ICP mass spectrometry.

Results of the tests are shown in Table 2. In Table 2, symbols in a column for the constant hygrothermal test (Ag cohesion test) represent degrees of occurrence of white spots; circles represent a state where any white spots were not formed (good), triangles represent a state where the Ag alloy thin films were partly clouded (fair), and crosses represent a state where Ag alloy thin films were entirely clouded (bad). In Table 2, symbols in a column for tarnishing (yellowing) by the salt water immersion test represent levels of salt water resistance; circles represent a state where the Ag alloy thin films did not come off and did not tarnished (good), triangles represent a state where the Ag alloy thin films partly tarnished (fair), and crosses represent a state where Ag alloy thin films came off entirely and tarnished (bad).

As obvious from Table 2, the initial reflectivities of the Ag alloy thin films in Comparative example 1 in the range of about 79 to about 84% decreased to those in the range of about 74 to 81% after the Ag cohesion test. Thus, the reflectivities of the Ag alloy thin films in Comparative example 1 are reduced by the Ag cohesion test (constant hygrothermal test), and the heat resistance thereof is unsatisfactory. The distribution of the reflectivities of the Ag alloy thin films in the aforesaid ranges is due to the respective different compositions of the Ag alloys forming the Ag alloy thin films.

The Ag alloy thin films in Comparative example 1 are unsatisfactory in either of or both Ag cohesion resistance, i.e., resistance to the formation of white spots, and salt water resistance, i.e., resistance to tarnishing and peeling. For example, although the Ag—Nd alloy thin film was satisfactory in Ag cohesion resistance and any white spots or cloudy parts were not formed therein, the salt water immersion test proved that the resistance of the Ag—Nd thin film to tarnishing determined by the salt water test was bad and the Ag—Nd thin film was tarnished and came off.

The Ag alloy thin films in Example 2, excluding the Ag—Bi thin film containing 5.0% Bi, had initial reflectivities in the range of about 75 to about 90% and post-Ag-cohesion reflectivities in the range of about 75 to about 89%, which proved that the initial reflectivities were reduced scarcely by the Ag cohesion test (constant hygrothermal test), and those thin films are excellent in heat resistance. Although the Ag—Bi thin film containing 5.0% Bi had a low initial reflectivity owing to its Bi content, this Ag—Bi thin film maintained its initial reflectivity after the constant hygrothermal test and had excellent heat resistance. The distribution of the reflectivities of the sample thin films in the aforesaid range is due to the difference in Bi content between the sample thin films.

The results of the Ag cohesion test and the salt water immersion test proved that the Ag alloy thin films in Example 2, excluding the Ag—Bi alloy thin film containing 0.01% Bi, were excellent in white spot resistance (resistance to Ag cohesion) and salt water resistance (resistance to tarnishing and peeling). For example, the Ag—Bi alloy thin film containing 0.04% Bi was satisfactory in white spot resistance and salt water resistance; that is, the Ag—Bi thin film was not clouded, formed no white spot, and did not tarnish and peeled. The Ag—Bi alloy thin film containing 0.01% Bi was partly clouded to a permissible extent owing to its Bi content. Although the reflectivity of this Ag—Bi alloy thin film decreased after the constant hygrothermal test, the decrease of the reflectivity was small and the Ag—Bi thin film was excellent in salt water resistance.

Thus, the Ag alloy thin films in Example 2 had high reflectivities and were excellent in heat resistance, saltwater resistance and weather resistance.

As apparent from Table 2, the reduction of the initial reflectivity after the Ag cohesion test of the Ag alloy thin film having a higher Bi content is greater than that of the Ag alloy thin film having a lower Bi content. Increase in the Bi content of the Ag alloy thin film increases the salt water resistance of the Ag alloy thin film. Desirable Bi content is in the range of 0.01 to 3.0 at %, more desirably, 0.05 to 1.0 at % from the viewpoint of reflectivity and salt water resistance. A Bi content exceeding 1.0 at % decreases the initial reflectivity slightly, and a Bi content exceeding 3.0 at % decreases the initial reflectivity greatly.

As apparent form the foregoing description, even though not coated with a protective film, the Ag—Bi alloy thin film of the present invention is very excellent in resistance to detrimental environmental conditions. Therefore, the Ag—Bi alloy thin film of the present invention is suitable for application to reflectors that avoid using protective films, such as backlight sheets for liquid crystal display panels, and those for optical devices.

EXAMPLE 3

Ag—Bi—X alloy thin films of 2000 Å in thickness in Example 3, i.e., Ag alloy thin films respectively containing Bi and X (X=Au, Pd, Cu, Nd or Y), and Ag—Bi alloy film were formed on glass substrate (#1737, Corning) of 50 mm in diameter and 0.7 mm in thickness, respectively, by a dc magnetron sputtering system. Conditions for forming the Ag—Bi—X alloy thin film were the same as those for forming the Ag—Bi alloy thin film in Example 1. A $Bi_2O_3$ layer was formed on the surfaces of the Ag—Bi alloy thin film and the Ag—Bi—X alloy thin films.

The initial reflectivities of those Ag alloy thin films to light of 405 nm in wavelength were measured. The post-Ag-cohesion reflectivities of those Ag alloy thin films, i.e., reflectivities of the Ag alloy thin films after Ag cohesion, to light of 405 nm in wavelength were measured after keeping the Ag alloy thin films in a constant-temperature constant-humidity atmosphere of 90° C. and 80% RH for 48 hr. The surfaces of the Ag alloy thin films were examined for white spots after Ag cohesion. The Ag alloy thin films were subjected to a salt water immersion test using salt water having a salt concentration of 0.05 mol/l to examine the salt water resistance of the Ag alloy thin films. The Ag alloy thin films were subjected to a heat treatment at 200° C. for 1 hr in an atmosphere evacuated to a pressure below $10^{-5}$ torr. The post-heating reflectivities of the Ag alloy thin films to light of 405 nm in wavelength were measured after the heat treatment. The composition of each of the Ag alloy thin films was analyzed by ICP mass spectrometry.

Results of the tests are shown in Table 3. As obvious from Table 3, the Ag—Bi—X alloy thin films are superior to the Ag—Bi alloy thin film in durability in a high-temperature, humid atmosphere. The number of white spots developed in the Ag—Bi—X thin films after the constant hygrothermal test was small as compared with that of white spots developed in the Ag—Bi alloy thin film. Addition of Au, Cu, Pd, Nd or Y to Ag—Bi thin films suppresses the development of white spots resulting from the constant hygrothermal test, and improves the durability of the Ag—Bi alloy thin films.

Heating reduces the reflectivity of the Ag—Bi—X thin films; that is, the post-heating reflectivity of the Ag—Bi—X thin film is lower than the initial reflectivity of the same. The Ag—B—Au alloy thin film, the Ag—Bi—Cu alloy thin film and the Ag—Bi—Pd alloy thin film are substantially the same as the Ag—Bi alloy thin film in the degree of reflectivity reduction due to heating. The respective degrees of reflectivity reduction due to heating of the Ag—Bi—Nd alloy thin film and the Ag—Bi—Y alloy thin film are small. Whereas the addition of Au, Cu or Pd to the Ag—Bi alloy thin film is scarcely effective in suppressing reflectivity reduction, the addition of Nd or Y to the same is very effective in suppressing reflectivity reduction. Thus, the addition of Nd or Y to the Ag—Bi alloy thin film is very effective in suppressing the reduction of reflectivity due to heating.

As apparent from the foregoing facts, the Ag—Bi—Nd alloy thin film and the Ag—Bi—Y alloy thin film of the present invention have a high heat resistance and resistance to detrimental environmental conditions. The Ag—Bi—Nd alloy thin film and the Ag—Bi—Y alloy thin film of the present invention are particularly suitable for application to reflectors for automotive lamps and lighting devices.

EXAMPLE 4

Laminated films were fabricated by depositing Bi oxide films of different thicknesses by a RF magnetron sputtering system on pure-Ag films formed by a dc magnetron sputtering system under the same process conditions as those for forming the Ag—Bi thin film in Example 1. A sputtering target of Bi oxide was used for depositing the Bi oxide films. Substrates were kept at a room temperature and the sputtering process was carried out in an Ar gas atmosphere of 3 mtorr. The thicknesses of the Bi oxide films were determined on the basis of film forming times required to form Bi oxide films respectively having different thicknesses in the range of 50 to 200 nm, and a thickness calibration curve.

Table 4 shows measured data. Since the reflectivity of the laminated film decreases with the increase of the thickness of the Bi oxide film, a desirable thickness of the Bi oxide film is 2.0 nm or below.

TABLE 1

| Item | Parameters |
| --- | --- |
| Beam energy | 2300 keV |
| Ions | $He^+$ |
| Scattering angle | 170° |
| Current | 30 nA |
| Dose | 40 µC |

TABLE 2

| | Test Nos. | Composition | Content of additive element (at %) | Constant hygrothermal test (Ag Cohesion test) | Reflectivity (Wavelength: 405 nm) (%) Initial | Reflectivity (Wavelength: 405 nm) (%) Post-Ag-cohesion test | Salt water immersion test Tarnishing (Yellowing) | Salt water immersion test Peeling |
| --- | --- | --- | --- | --- | --- | --- | --- | --- |
| Example 2 | 1 | Pure Ag | — | X | 90.8 | 82.8 | ○ | peeled |
| | 2 | Ag—Bi | 0.01 | ○-Δ | 90.1 | 88.8 | ○ | not peeled |
| | 3 | | 0.04 | ○ | 89.9 | 89.1 | ○ | not peeled |
| | 4 | | 0.12 | ○ | 88.5 | 88.3 | ○ | not peeled |
| | 5 | | 0.19 | ○ | 86.1 | 86.3 | ○ | not peeled |
| | 6 | | 1.2 | ○ | 82.6 | 82.3 | ○ | not peeled |
| | 7 | | 3.0 | ○ | 75.4 | 75.2 | ○ | not peeled |
| | 8 | | 5.0 | ○ | 60.4 | 61.1 | ○ | not peeled |
| Comparative example 1 | 16 | Ag—Nd | 1.0 | ○ | 81.3 | 80.9 | X | peeled |
| | 17 | Ag—In | 0.40 | X | 84.3 | 77.9 | Δ | not peeled |
| | 18 | Ag—Nb | 0.92 | Δ | 79.2 | 75.6 | Δ | peeled |
| | 19 | Ag—Sn | 0.88 | X | 82.6 | 74.1 | X | peeled |

TABLE 3

| Test Nos. | Composition | Content of additive element (at %) Bi | Other elements | Number of white spots after constant hygrothermal test (Ag Cohesion test) | Reflectivity (Wavelength: 405 nm) (%) Initial | Reflectivity (Wavelength: 405 nm) (%) Post-Ag-cohesion test | Reflectivity (Wavelength: 405 nm) After heating |
|---|---|---|---|---|---|---|---|
| Example 3 20 | Ag | — | — | 101 | 90.8 | 82.1 | 70.4 |
| 21 | Ag—Bi | 0.15 | — | 12 | 86.2 | 86.1 | 79.6 |
| 22 | Ag—Bi—Au | 0.19 | 0.3 | 8 | 85.9 | 85.9 | 78.2 |
| 23 | | 0.19 | 1.2 | 0 | 84.8 | 84.9 | 78.9 |
| 24 | Ag—Bi—Cu | 0.19 | 0.4 | 8 | 85.8 | 85.2 | 76.8 |
| 25 | | 0.19 | 1.1 | 4 | 85.8 | 85.6 | 76.4 |
| 26 | Ag—Bi—Pd | 0.19 | 0.3 | 8 | 84.1 | 83.9 | 77.9 |
| 27 | | 0.19 | 1.5 | 4 | 80.3 | 80.1 | 75.6 |
| 28 | Ag—Bi—Nd | 0.21 | 0.3 | 5 | 84.3 | 84.2 | 81.1 |
| 29 | | 0.21 | 1.0 | 4 | 81.8 | 81.9 | 80.1 |
| 30 | Ag—Bi—Y | 0.21 | 0.3 | 6 | 84.1 | 83.9 | 80.6 |
| 31 | | 0.21 | 0.9 | 7 | 83.8 | 83.5 | 79.9 |

TABLE 4

| Processing time (s) | Thickness (nm) | Reflectivity (%) (Wavelength: 405 nm) |
|---|---|---|
| 2 | 1.0 | 83.0 |
| 4 | 2.0 | 74.8 |
| 6 | 3.0 | 65.2 |
| 8 | 4.0 | 52.3 |

As apparent form the foregoing description, the reflective Ag alloy film of the present invention for reflectors has a high reflectivity and excellent in weather resistance and heat resistance. Thus, the reflective Ag alloy film is suitable for forming reflectors and improves the function and durability of reflectors.

The reflector of the present invention is fabricated by forming the reflective Ag alloy film of the present invention having the aforesaid excellent characteristics on the base member. Thus, the reflector has a high reflectivity and improved functions.

The sputtering target of the Ag alloy according to the present invention is suitable for and capable of depositing the reflective Ag alloy film having excellent characteristics on the base member by a sputtering process.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A reflective Ag alloy film for reflectors, comprising: an Ag alloy thin film containing Bi; and at least one of a Bi layer and a Bi oxide layer formed on a surface of the Ag alloy thin film or between the Ag alloy thin film and another layer formed on the Ag alloy thin film, wherein the Ag alloy thin film contains in a total amount of 0.1 to 3.0 at % at least one of Nd and Y.

2. The reflective Ag alloy film according to claim 1, wherein at least one of the Bi layer and the Bi oxide layer has thickness of 2.0 nm or below.

3. The reflective Ag alloy film according to claim 1, wherein the Ag alloy thin film has a Bi content in the range of 0.01 to 3.0 at %.

4. The reflective Ag alloy film according to claim 3, wherein the Ag alloy thin film contains one or some of Au, Pt, Pd and Cu in a content in the range of 0.3 to 5.0 at %.

5. A reflector comprising: a base member; and the reflective Ag alloy stated in claim 1.

6. The reflector according to claim 5 further comprising a transparent protective layer formed over the reflective Ag alloy film.

7. The reflector according to claim 5, wherein the Ag alloy thin film is deposited on the base member by a sputtering process.

8. A method of making a reflective Ag alloy film, the method comprising:
    sputtering on a base member an Ag alloy thin film containing Bi and at least one of Nd and Y;
    sputtering on the Ag alloy thin film at least one of a Bi layer and a Bi oxide layer; and producing the reflective Ag alloy film of claim 1.

* * * * *